Sept. 14, 1954  J. H. SCHMID  2,689,058
CLOSURE UNIT
Filed Jan. 15, 1951

INVENTOR.
John H. Schmid
BY
Florian G. Miller
Atty.

Patented Sept. 14, 1954

2,689,058

UNITED STATES PATENT OFFICE 2,689,058

CLOSURE UNIT

John H. Schmid, Erie, Pa., assignor to J. A. Zurn Mfg. Co., Erie, Pa., a corporation of Pennsylvania Application January 15, 1951, Serial No. 205,997

1 Claim. (Cl. 220—39)

This invention relates generally to closure units and more particularly to a novel closure for a cleanout opening in a pipe line or the like and sealing means therefor.

All devices of this character, made in accordance with the teachings of the prior art, have had very poor seals so that there would be leakage of sewer gas where a cleanout opening unit was connected to a sewer line. A sealing member has been found suitable for short periods of time in closure units; however, the caulking material is forced between the threads on the cleanout plug and the internal threaded portion of the pipe end in which it is threadably engaged so that it is practically impossible to remove the plug without destroying it. Furthermore, it has not been possible to remove the plugs in these prior closure units and replace them without destroying the seal. Sealing material also works out of these prior devices, thereby causing leakages. It has also been difficult to caulk or otherwise force the caulking or casting material into sealing engagement with the plug and its engaging hub in these prior closure units. No suitable sealing means has heretofore been provided for conventional screw threaded units. The screw threads on these prior closure units are necessarily machined to close tolerances for a tight fit, thereby increasing the cost of manufacture thereof. Prior closure units corrode rapidly.

It is, accordingly, an object of my invention to overcome the above and other defects in closure units and it is more particularly an object of my invention to provide a closure unit and sealing means therefor which is simple in construction, economical in cost, economical in manufacture, and easy to assemble and disassemble.

Another object of my invention is to provide novel means for closing and sealing a cleanout opening in a pipe line.

Another object of my invention is to provide novel means of caulking a closure in the end of a pipe without forcing the caulking material into the threads of the closure member and pipe.

Another object of my invention is to provide caulking or sealing material for a closure member in the end of a pipe which permits comparatively easy removal of the closure member or plug.

Another object of my invention is to provide a sealing member for a cleanout plug which is not destroyed when the plug is removed from the end of a pipe.

Another object of my invention is to provide a closure unit in which a close threaded fit is not required.

Another object of my invention is to provide novel means for sealing a closure member in the end of a pipe which holds the caulking material in sealing relationship with the plug and prevents it from working out and becoming loose.

Another object of my invention is to provide a minimum of corrosion in a closure unit.

Other objects of my invention will become evident from the following detailed description, taken in conjunction with the accompanying drawings, in which Fig. 1 is a plan view of my novel closure unit;

Figure 1:
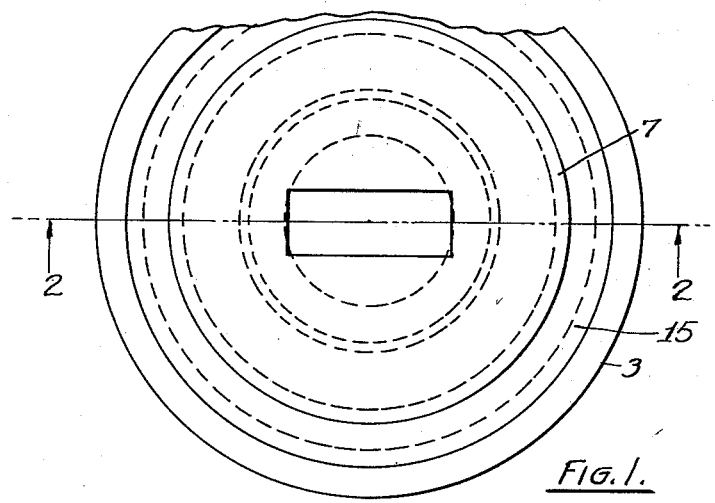
Figure 2:
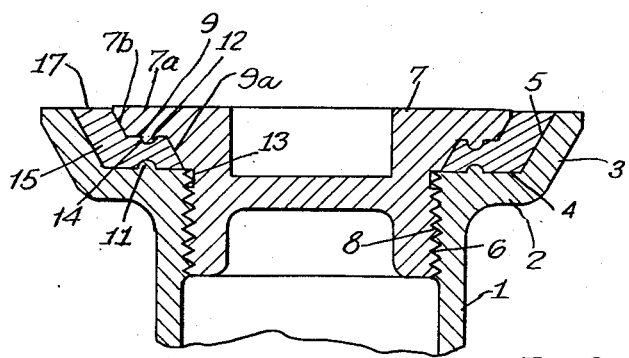
Fig. 2 is a view taken on the line 2—2 of Fig. 1.

Referring now to the drawings, I show in Figs. 1 and 2 a cylindrical member 1 forming the end of a pipe or the like and comprising a cleanout opening leading to a pipe, tank, or any other similar container unit. The member 1 is flanged outwardly at 2 and flared angularly upwardly at 3. An internal shoulder 4 is normal to the axis of the cylindrical member 1 and connects the inner tapered surface 5 of the flared out portion 3 with the internally threaded portion 6 of the member 1. A cleanout plug or closure member 7 is externally threaded at 8 for threadable engagement with the threaded portion 6 of the member 1. The upper end of the closure member 7 has an outwardly directed flanged portion 7a with a tapered periphery 7b spaced from the flared portion 3 of the member 1. The lower surface 9 of the flanged portion 7a is substantially parallel to the shoulder 4 of the member 1. A tapered surface 9a merges into the under surface 9 of the flange 7a and the outer side of the closure member 7. The shoulder 4 has a raised annular bead 11 formed thereon spaced from the inner margin thereof in substantially opposed axially spaced relationship to a depending annular bead 12 on the lower face 9 of the flanged portion 7a of the closure member 7. The closure member 7 has an annular groove 13 with the upper side 14 thereof in substantial alignment with the surface of the shoulder 4 of the member 1. Caulking material 15, such as lead or other suitable material, is disposed between the shoulder 4 and the outwardly directed flanged portion 7a of the closure member 7.

In connecting and sealing my novel closure unit, I first insert the closure member 7 in the member 1 as shown particularly in Fig. 2 with the upper side of the closure member 7 in substantially the same horizontal plane as the top of the flared portion 3 of the member 1 and with the upper side 14 of the groove 13 in substantially the same horizontal plane as the face of the shoulder 4 of the member 1. Caulking material 15 is then cast or inserted between the shoulder 4 of the member 1 and the outwardly directed flange 7a of the closure member 7. After the caulking material 15 is positioned, the closure member 7 is then rotated, if this is possible, a slight amount to thoroughly compress the caulking material 15 and seal the closure unit. The opposing beads 11 and 12 will thus force the caulking material 15 into sealing relationship with the outer side of the closure member 7 and hold it in this relationship. Any excess caulking material 15 will escape into the groove 13, thus assisting in sealing the closure unit without fouling the threads so that the closure member 7 may be easily rotated and removed from the member 1 and again inserted therein. The caulking material 15 is caulked with a suitable caulking tool at 17, the tapered inner surface 5 of the flared portion 3 assisting in forcing the caulking material 15 into engagement with the outer wall of the closure member 7. The tapered surfaces 7b and 9a on the closure member 7 minimize the resistance to rotation and upward movement of the closure member 7 so that it may be easily removed and replaced without destroying the seal. The top surface of the closure member 7 can be left a fraction of an inch above the top of the member 1, the caulking material 15 poured, and the closure member 7 then rotated to compress the caulking material 15. The caulking material 15 may be pre-cast and placed in position as shown in Fig. 2 whereupon the closure member 7 is rotated and the caulking material 15 caulked the same as has heretofore been described when the caulking material 15 is poured at the time of assembly.

Figure 3:
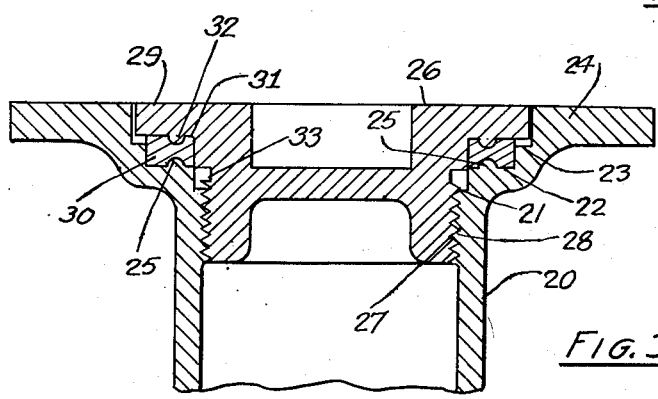
Fig. 3 is a vertical cross sectional view of a modified form of my novel closure unit.

In Fig. 3, I show a modified form of my invention which has substantially the same construction and use as my closure unit shown in Figs. 1 and 2. Fig. 3 shows an end of a tubular member 20 having stepped inner shoulders 21, 22, and 23 formed on the inner side of an outwardly flared portion 24. Intermediate shoulder 22 has a raised annular bead 25 spaced from the inner marginal edge thereof. A closure member 26 has a threaded portion 27 for threadable engagement with the threaded portion 28 of the member 20. The closure member 26 also has an outwardly directed flanged portion 29 on the upper end thereof which fits snugly into the upper recessed portion in the upper end of the member 20. A caulking ring 30 of lead or like material is disposed between the shoulder 22 of the member 20 and the under side 31 of the outwardly directed flange 29 on the closure member 26. The outwardly directed flange 29 has a depending annular bead 32 on the under side thereof which is in opposed relationship with the bead 25 on the shoulder 22 of the member 20. The offset portion 33 is spaced from the threads 27 of the closure member 26 to provide an open annular space to receive the caulking ring 30 forced therein and to prevent it from fouling the threads 27 and 28.

In the assembly of my closure unit shown in Fig. 3, the caulking ring 30 of annular configuration is disposed on the shoulder 22 of the member 20. The closure member 26 is then threadably engaged with the threaded portion 28 of the member 20. In drawing up the closure member 26, the beads 25 and 32 are forced into the caulking material of the ring 30, thereby forcing a portion of the caulking material against the outer side of the closure member 26. The offset portion 33 provides an opening so that caulking material can escape into the opening formed thereby to prevent the fouling of the threads 27 and 28 and thereby permit the easy removal and replacement of the closure member 26. The shoulder 23 is spaced a predetermined distance below the top of the caulking ring 30 when it is first disposed on the shoulder 22 so that the outer upper side of the caulking ring 30 may expand and move into the open space formed between the shoulder 23 and the flanged portion 29 of the plug or closure member 26 so that perfect sealing is assured.

There is no close threaded fit required in my novel closure unit to obtain a seal. A loose threaded connection is desirable in my closure unit. There is no tendency toward corrosion in my closure unit.

It will be evident from the foregoing description that I have provided a novel closure unit which is particularly adaptable for use as a cleanout plug in an opening in a pipe line, which has novel caulking means for sealing the closure unit, which prevents caulking material from fouling up threads of the closure unit, which permits easy insertion and removal of the closure member or cleanout plug without destroying the seal, which minimizes corrosion, which permits comparatively free rotation of the cleanout plug or closure member at all times, and which is very easy to install.

Various changes may be made in the specific embodiment of my invention without departing from the spirit thereof or from the scope of the appended claim.

What I claim is:

A closure unit for a drainage pipe comprising an internally threaded cylindrical member having an internal shoulder in the upper end thereof, an outwardly and upwardly angularly flared portion on the upper end of said cylindrical member extending from the outer side of said shoulder, a closure member having a threaded portion in threadable engagement with the threaded portion of said cylindrical member, an outwardly flanged portion on said closure member having the outer side thereof tapered and spaced from said outwardly flared portion of said cylindrical member, a second outwardly flared portion on said closure member adjacent said threaded portion, a lead caulking material disposed between said shoulder and flared portion of said cylindrical member and the underside of said flanged portion of said closure member through the space between said outwardly flared portion of said cylindrical member and the outer side of the flanged portion of said closure member, said lead caulking material completely filling the space between the flanged portion of said closure member and the shoulder and the outwardly flared portion of said cylindrical member, a first annular bead on said internal shoulder of said cylindrical member, and an annular bead on said outwardly flanged portion in opposed relation and in axial alignment with said first bead whereby said lead caulking material is forced into engagement with said shoulder and said flanges.

References Cited in the file of this patent

UNITED STATES PATENTS

| Number | Name | Date |
|---|---|---|
| 1,566,983 | Sheriff | Dec. 22, 1925 |
| 1,798,491 | Perry | Mar. 31, 1931 |
| 1,864,957 | Stout | June 28, 1932 |
| 1,911,455 | Luff | May 30, 1933 |
| 1,972,156 | McCrudden | Sept. 4, 1934 |
| 2,169,312 | Wilking | Aug. 15, 1939 |
| 2,191,902 | Wheaton | Feb. 27, 1940 |
| 2,343,235 | Bashark | Feb. 29, 1944 |
| 2,371,633 | Lippincott | Mar. 20, 1945 |
| 2,451,599 | Wiltse | Oct. 19, 1948 |
| 2,537,249 | Walton | Jan. 9, 1951 |